(12) United States Patent
Miki

(10) Patent No.: US 7,310,954 B2
(45) Date of Patent: Dec. 25, 2007

(54) CRYOGENIC SYSTEM

(75) Inventor: Takashi Miki, Kobe (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 395 days.

(21) Appl. No.: 11/026,153

(22) Filed: Jan. 3, 2005

(65) Prior Publication Data
US 2007/0271933 A1   Nov. 29, 2007

(30) Foreign Application Priority Data
Jan. 26, 2004   (JP) .............................. 2004-017397

(51) Int. Cl.
  F25B 19/00   (2006.01)
  F25B 9/00    (2006.01)
  F28F 13/00   (2006.01)
  F28F 27/00   (2006.01)

(52) U.S. Cl. .............................. 62/51.1; 62/6; 165/276; 165/135

(58) Field of Classification Search ................. 62/6, 62/51.1; 165/276, 135
See application file for complete search history.

(56) References Cited

U.S. PATENT DOCUMENTS

| | | | |
|---|---|---|---|
| 3,391,728 A * | 7/1968 | Franklin | 165/277 |
| 3,807,188 A * | 4/1974 | Lagodmos | 62/51.1 |
| 4,689,970 A * | 9/1987 | Ohguma et al. | 62/51.1 |
| 5,056,317 A * | 10/1991 | Stetson | 62/6 |
| 5,113,165 A * | 5/1992 | Ackermann | 335/216 |
| 5,379,601 A * | 1/1995 | Gillett | 62/51.1 |
| 5,842,348 A * | 12/1998 | Kaneko et al. | 62/51.1 |
| 5,918,470 A | 7/1999 | Xu et al. | |
| 5,960,868 A * | 10/1999 | Kuriyama et al. | 165/135 |
| 6,164,077 A | 12/2000 | Feger | |
| 6,959,554 B1 * | 11/2005 | Shirron et al. | 62/3.1 |

* cited by examiner

*Primary Examiner*—William C Doerrler
(74) *Attorney, Agent, or Firm*—Reed Smith, LLP; Stanley P. Fisher, Esq.; Juan Carlos A. Marquez, Esq.

(57) ABSTRACT

A cryogenic system includes a space formed between a cooling stage of a cryocooler unit and an element to be cooled, and a thermal joint placed in the space, wherein the thermal joint is composed of a substance that has a melting point higher than the cooling temperature of the element to be cooled and that is in a liquid or gaseous state at room temperature and atmospheric pressure. The cryogenic system can achieve reproducible and excellent thermal contact at a cooling stage without applying a large mechanical stress to a cryocooler unit structure.

11 Claims, 13 Drawing Sheets

CRYOGENIC SYSTEM

BACKGROUND OF THE INVENTION

1. Field of the Invention

The present invention relates to a cryogenic system for cooling a superconducting magnet or the like.

2. Description of the Related Art

It is well known that a superconducting magnet apparatus must be kept at cryogenic temperatures to maintain the superconductivity. Examples of cooling means include a method of immersing the superconducting magnet in a cryogen, such as liquid helium, and a method for cooling the superconducting magnet directly with a cryocooler without using a cryogen.

FIG. 13 shows a structure of a conventional cryogenic system. This is magnetic resonance imaging (MRI), which is known as a medical apparatus. FIG. 13 is a longitudinal section of the cryogenic system housing a superconducting solenoid magnet having a horizontal central axis.

This cryogenic system includes a cryocooler unit 51, a vacuum chamber 52, a superconducting magnet 53, a liquid helium bath 55, and a radiation-shield 56. The superconducting magnet 53 is placed in the vacuum chamber 52 and generates a large magnetic field. The liquid helium bath 55 houses the superconducting magnet 53 and contains liquid helium 54 for cooling the superconducting magnet 53. The radiation-shield 56 is provided between the vacuum chamber 52 and the liquid helium bath 55 to shield radiation from the vacuum chamber 52 to the liquid helium bath 55.

The cryocooler unit 51 has two stages; a first cooling stage 57 is thermally coupled to the radiation-shield 56 and a second cooling stage 58 is thermally coupled to a recondenser 59, each stage being cooled at each predetermined temperature. A sleeve 60 housing the cryocooler unit 51 and the liquid helium bath 55 communicate with each other. Spaces over the liquid helium bath 55 and within the cryocooler sleeve 60 are filled with helium having a saturated vapor pressure at an operating temperature of the superconducting magnet 53.

In such a helium recondensing cryogenic system, the cryocooler unit 51 that has a cooling capacity at as low as 4.2 K at the second cooling stage 58 is adopted.

Thus, the recondenser 59 has a surface temperature lower than the temperature of liquid helium. When a gaseous phase of the liquid helium 54 comes into contact with the recondenser 59, it can be recondensed into liquid helium. Thus, in the system shown in FIG. 13, a user does not need to refill liquid helium 54 as long as the cryocooler unit 51 operates, and can use the cryogenic system without monitoring a cryogenic coolant.

However, the operation of the cryocooler unit 51 shown in FIG. 13 is interrupted by periodical replacement of internal components or maintenance of a compressor unit, which supplies compressed gas to the cryocooler unit 51. During such a maintenance, an increased amount of heat is transferred to the liquid helium bath 55, promoting the evaporation of liquid helium 54. Furthermore, evaporated helium is not recondensed by the cryocooler unit 51 during the maintenance and is entirely released from the system.

Thus, liquid helium 54 gradually decreases because of repeated maintenance and must be refilled. This increases the operation cost of the system. In the system shown in FIG. 13, therefore, the maintenance time should be as short as possible to reduce the flow of heat into the liquid helium bath 55.

It should be noted that although the shutdown of the compressor does not take many hours, the maintenance of the cryocooler unit 51 takes considerable time. That is, procedures of removing the cryocooler unit 51 from the cryocooler sleeve 60; putting a new cryocooler unit 51 into the cryocooler sleeve 60; starting the new cryocooler unit 51; and waiting until a steady state is reached cannot be omitted.

Thus, in addition to the prompt replacement of the cryocooler unit 51, the reduction of the time to reach the steady state is required to be shorten. Thus, the maintenance cannot be shortened to a few hours.

The second problem in the maintenance of the cryogenic system relates to thermal resistance between the cryocooler unit 51 and an element to be cooled.

In the structure shown in FIG. 13, to get the best performance from the cryocooler unit 51, a thermal contact between the first cooling stage 57 and the radiation-shield 56, and a thermal contact between the second cooling stage 58 and the recondenser 59 must be reproducibly maintained in good condition. For example, a poor thermal contact between the first cooling stage 57 and the radiation-shield 56 results in a large difference in temperature at the interface (thermal contact resistance) when unit heat passes through the contact. This increases the temperature of the radiation-shield 56 and therefore increases the flow of heat into the liquid helium bath 55. At worst, the flow of heat into the liquid helium bath 55 exceeds the capacity of the recondenser 59; that is, not all the helium evaporated from the liquid helium 54 can be recondensed even when the cryocooler unit 51 is in operation. Thus, cryogen (liquid helium) must be added periodically. This considerably impairs the operationability of the cryogenic system.

A poor thermal joint between the second cooling stage 58 and the recondenser 59 is more serious. In the cryocooler unit 51 shown in FIG. 13, since the second cooling stage 58 has a much smaller cooling capacity than the first cooling stage 57, even a small difference in temperature at the second cooling stage 58 largely affects the recondensation. Even when both thermal joints have the same temperature difference of 1 K, for example, this is obvious when the ratio of the temperature difference to the operating temperatures of the first cooling stage 57 and the second cooling stage 58 are considered.

Thus, when the temperature difference between the second cooling stage 58 and the recondenser 59 is large, the temperature of the recondenser 59 does not decrease sufficiently. At worst, cooling fins become higher in temperature than liquid helium 54 and cannot recondense helium gas. This also leads to the refilling of cryogen.

Increased thermal resistance between the cryocooler unit and an element to be cooled partly results from contamination in the cryocooler sleeve 60.

When the cryocooler unit 51 is removed from the cryocooler sleeve 60, the temperature inside the cryocooler sleeve 60 is lower than the ambient temperature. In general, the temperature is 30 to 60 K at the radiation-shield 56, and about 3 to 5 K at the bottom of the cryocooler sleeve 60. Thus, when perfect measures are not taken to prevent the outside air from entering the cryocooler sleeve 60, the air in the amount corresponding to the cryocooler unit 51 enters from the outside of the vacuum chamber 52. This causes deposition of water vapor and air within the cryocooler sleeve 60. As a result, this decreases the contact area at the interface between the first cooling stage 57 and the radiation-shield 56, increases the thermal resistance, and may cause the same problem as described above.

In the past, many attempts to overcome these two big problems, that is, shortening of the maintenance and reduction of the thermal resistance between the cryocooler unit and the element to be cooled were made.

For example, one described in U.S. Pat. No. 5,918,470 is already known.

This prior art utilizes a hermetic liquid helium container, which eliminates the addition of cryogen. Furthermore, a cooling stage of a cryocooler unit and a recondenser of the liquid helium container (bath) are spaced at a predetermined interval. A thermal joint of an indium gasket is placed in the gap to reduce thermal resistance between the cryocooler unit and an element to be cooled.

However, in the technique described in U.S. Pat. No. 5,918,470, to make effective use of the gasket to decrease the thermal resistance, very high pressure must be applied to pinch the gasket. This may damage the cryocooler unit even with a soft metal gasket like indium.

Since the thermal contact resistance between two materials at cryogenic temperatures decreases as the contact pressure increases, the two materials should be pressed against each other at the highest possible pressure to improve heat transfer at the contact surface of the thermal joint. However, in general, the portion of the cryocooler unit between the first cooling stage and the second cooling stage is often made of very thin material to reduce the heat flow. Thus, the cryocooler unit may be damaged by a large mechanical stress.

On the contrary, an insufficient mechanical stress results in a large thermal resistance. Thus, it is very difficult to adjust the mounting position of the cryocooler unit so that the mechanical stress would not be too large and not too small.

Furthermore, when the cryocooler unit is removed for maintenance, in the cryogenic system with the indium gasket, heat may flow into the liquid helium container from the gasket. Thus, it may take many hours to resume the operation.

In addition, replacement of the gasket after removing the cryocooler unit takes additional time for maintenance.

In an attempt to overcome the problem described above, U.S. Pat. No. 6,164,077 proposed a heat transfer mechanism in which a liquid at a cryogenic temperature is introduced into a thermal joint between a second cooling stage and an element to be cooled, evaporates on the element to be cooled, and recondenses at the second cooling stage.

The prior art described in U.S. Pat. No. 6,164,077 has many advantages. Since the thermal joint is achieved by the evaporation and recondensation of a liquid coolant, a cryocooler unit can be easily removed and mounted. Moreover, since no stress is applied to the cooling stage, the precision of mounting position of the cryocooler unit is not an important issue.

However, for a superconducting magnet made of a superconducting metal wire as in this prior art, the element to be cooled must be maintained at the liquid helium temperature or lower. Thus, a possible thermal joint medium (cryogen) is only liquid helium. Furthermore, two mechanisms, that is, evaporation and recondensation of the cryogen are required in series between the element and the cryocooler unit. This results in a larger difference in temperature and therefore lower efficiency than the thermal transfer via a solid.

Furthermore, both techniques described in U.S. Pat. No. 5,918,470 and U.S. Pat. No. 6,164,077 cannot solve the problem of contamination in the cryocooler sleeve.

SUMMARY OF THE INVENTION

In consideration of these situations, an object of the present invention is to provide a cryogenic system that reproducibly achieves excellent thermal contact at a cooling stage without applying a large stress to a cryocooler unit structure.

Another object of the present invention is to provide a cryogenic system in which a cryocooler unit is easily removed and mounted during maintenance.

Still another object of the present invention is to provide a cryogenic system that prevents a sleeve from being contaminated with the outside air even when a cryocooler unit is removed, and that prevents heat from flowing into an element to be cooled.

To achieve the objects described above, the present invention took the following measures. A cryogenic system according to the present invention In the structure described above, the substance of the thermal joint is in a solid state when the cryocooler unit is in operation. The substance may be in a liquid or gaseous state when the cryocooler unit is at rest.

While thermal conductivity of any substance usually decreases remarkably when the substance changes in phase from solid to gas, a substance that has the melting point of a cryogenic temperature and is in a gaseous state at room temperature has a very high thermal conductivity, which is similar to that of an alloy, at a solid state.

Thus, the thermal switch of the thermal joint according to the present invention is on when the cryocooler unit is in operation, and an element to be cooled is cooled efficiently.

In a cryogenic system according to the present invention, when the cryocooler unit is removed from or mounted on the element to be cooled, the thermal joint can be in a liquid or gaseous phase. Thus, the cryocooler unit is easily removed or mounted. The cryocooler unit is mounted through the space and therefore is easily positioned. Furthermore, when the cryocooler unit is mounted on the thermal joint in a liquid or gaseous state, no stress is applied on the cryocooler unit and therefore possible damage of the cryocooler unit can be prevented.

The substance of the thermal joint contains at least one selected from the group consisting of nitrogen, neon, para-hydrogen, and water.

The cryogenic system may comprise a sleeve housing the thermal joint.

Preferably, heating means for heating the thermal joint is provided.

This heating means can force phase conversion of the thermal joint from solid to liquid or gas and thus shorten the time of removing the cryocooler unit.

Preferably, cryogenic system comprises a buffer tank for storing the substance, and the buffer tank is coupled to the thermal joint via a connecting pipe.

Preferably, the substance stored in the buffer tank is hydrogen, and a catalyst vessel containing a catalyst for ortho-para hydrogen conversion is intervened by the connecting pipe.

The element to be cooled may have a liquid helium container including a superconducting magnet and liquid helium. The sleeve may be provided on the liquid helium container. An enclosed recondenser may be vertically provided in the sleeve. The thermal joint may be provided on the recondenser.

The circumference of the element to be cooled may be covered with a radiation-shield, the circumference of which may be covered with a vacuum chamber. The sleeve may be provided between the vacuum chamber and the element to be cooled. The cooling stage may be provided in the sleeve in a manner such that the cooling stage can be inserted and removed as desired.

The cooling stage includes a first cooling stage on the side of higher temperatures and a second cooling stage on the side of lower temperatures. Preferably, the first cooling stage cools the radiation-shield and the second cooling stage cools the element to be cooled, and the first cooling stage and/or the second cooling stage is provided with the thermal joint.

The element to be cooled may be a superconducting magnet.

Preferably, a surface of the element to be cooled, in contact with the thermal joint, is made of a first material having a high thermal conductivity, such as copper, and the sleeve is made of a second material having a lower thermal conductivity than the first material, such as stainless steel, and the sleeve is provided with a deformation absorber for absorbing vertical deformation.

The present invention provides a cryocooler unit that reproducibly achieves excellent thermal contact without applying a large stress to a cryocooler unit structure.

Furthermore, the cryocooler unit can be easily removed and mounted during maintenance.

In addition, even when the cryocooler unit is removed, heat can hardly flow into an element to be cooled.

DESCRIPTION OF THE PREFERRED EMBODIMENTS

Embodiments according to the present invention will now be described with reference to the drawings.

Figure 1:
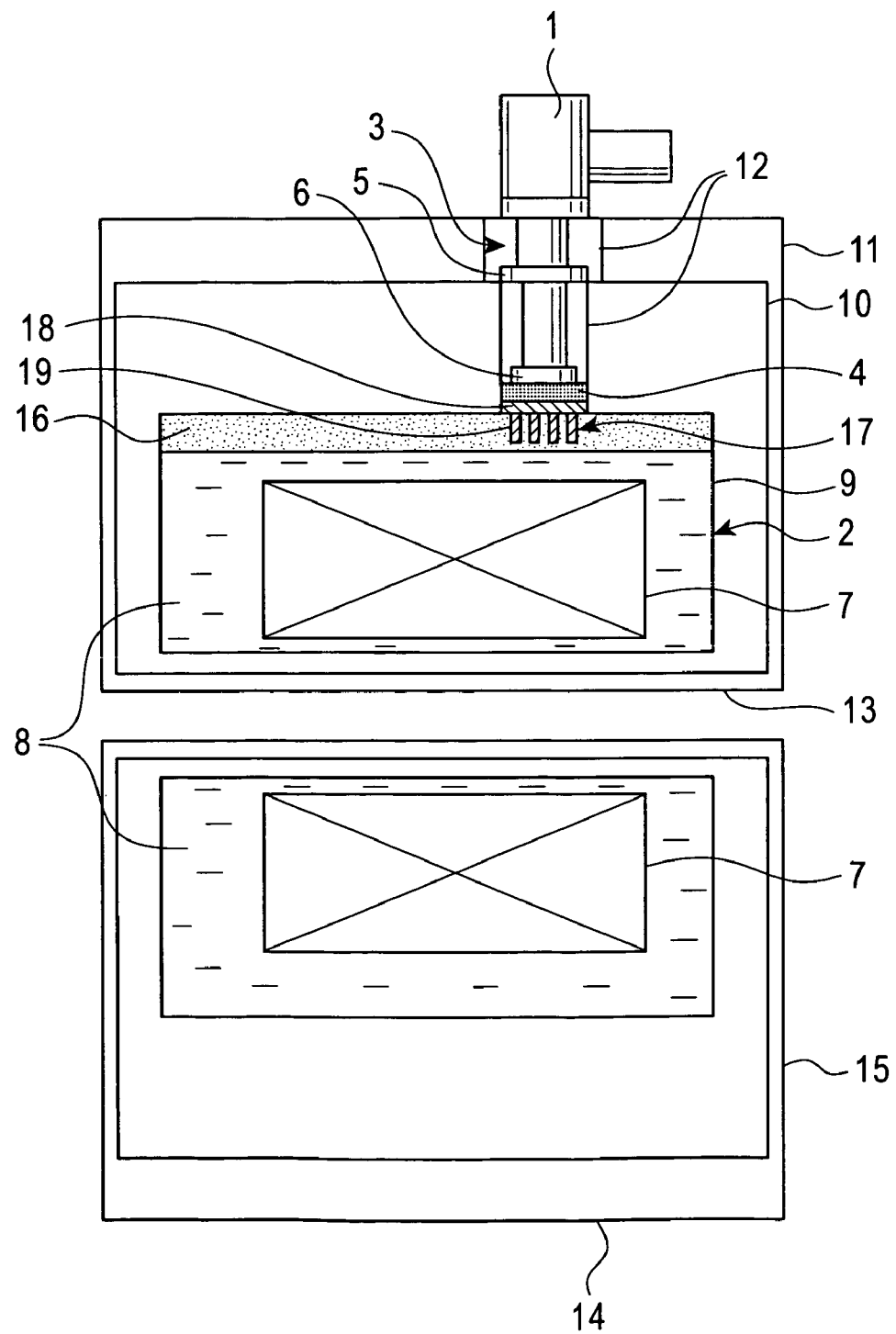
FIG. 1 is a schematic sectional view of a cryogenic system according to an embodiment of the present invention.

FIG. 1 is a schematic sectional view of one example of a cryogenic system, MRI. This cryogenic system includes a cryocooler unit 1 and an element to be cooled 2. The cryocooler unit 1 includes a cooling stage 3. A space is formed between the cooling stage 3 and the element to be cooled 2, and a thermal joint 4 is placed in the space. The thermal joint 4 is composed of a substance that has the melting point higher than the cooling temperature of the element to be cooled 2 and that is in a liquid or gaseous state at room temperature and atmospheric pressure. The thermal switch of the thermal joint 4 is on in a solid state.

The exemplary cooling stage 3 includes a first cooling stage 5 and a second cooling stage 6 in series. The second cooling stage 6 has a temperature of about 4 K, which is lower than that of the first cooling stage 5. The second cooling stage 6 has a cooling capacity lower than that of the first cooling stage 5.

The element to be cooled 2 includes a liquid helium container 9 including a superconducting magnet 7 and liquid helium 8. The circumference of the liquid helium container 9 is covered with a radiation-shield 10. The circumference of the radiation-shield 10 is covered with a vacuum chamber 11. A sleeve 12 is provided between the vacuum chamber 11 and the helium container 9.

The sleeve 12 is cylindrical and is provided through the radiation-shield 10. The cryocooler unit 1 is provided so as to place the cooling stage 3 of the cryocooler unit 1 in the sleeve 12 in a manner such that the cryocooler unit 1 can be inserted and removed as desired. A space is formed between an end face of the second cooling stage 6 of the cooling stage 3 and the liquid helium container 9. The thermal joint 4 is formed in the space.

The vacuum chamber 11 has a circular internal space formed by an inner wall 13 and an outer wall 14, which are concentrically disposed at a predetermined interval, and by side walls 15, 15, which connect the inner wall and the outer wall. The vacuum chamber 11 is disposed so as to have a horizontal central axis. A center space formed by the circular inner wall 13 has openings at both right and left ends.

The radiation-shield 10 and the liquid helium container 9 housed in the circular space of the vacuum chamber 11 are also cylindrical and are closed at both ends, as with the vacuum chamber 11. A superconducting magnet 7 housed in the liquid helium container 9 is also cylindrical. The superconducting magnet 7, the liquid helium container 9, the radiation-shield 10, and the vacuum chamber 11 are disposed concentrically.

The circular space within the vacuum chamber 11 is maintained at a predetermined vacuum pressure, and the space within the radiation-shield 10 is also maintained at the same pressure.

A space is formed between the surface of liquid helium 8 in the liquid helium container 9 and the inner surface of the liquid helium container 9. The space is filled with helium gas 16 at a saturated vapor pressure.

The lower end of the sleeve 12 is hermetically connected to the top of the liquid helium container 9. The sleeve 12 and the liquid helium container 9 are integrated into one piece by welding or other processing. An enclosed recondenser 17 is vertically provided in the sleeve 12.

The recondenser 17 is provided with a shield plate 18, which is tightly coupled to the inner surface of the sleeve 12, and a fin 19 suspended from the undersurface of the shield plate 18. The recondenser 17 may be fixed to the liquid helium container 9, instead of being fixed to the inner surface of the sleeve 12.

The recondenser 17 is made of a material having a high thermal conductivity, such as copper. The sleeve 12 is made of a material having a low thermal conductivity, such as stainless steel. The upper end of the sleeve 12 has an opening in the surface of the vacuum chamber 11. The cooling stage 3 of the cryocooler unit 1 is inserted from this opening. The opening at the upper end of the sleeve 12 can be sealed by fitting the cryocooler unit 1.

The first cooling stage 5 in the sleeve 12 is thermally coupled to the radiation-shield 10 and chills the radiation-shield 10. A predetermined space is formed between the undersurface of the second cooling stage 6 and the top surface of the shield plate 18 of the recondenser 17. This space is filled with the substance of the thermal joint 4.

The thermal joint 4 is composed of the substance, which has the melting point higher than the cooling temperature of the element to be cooled 2 and that is in a liquid or gaseous state at room temperature and atmospheric pressure. The amount of the substance in a solid state is sufficient to thermally connect the second cooling stage 6 and the recondenser 17. Specifically, the substance of the thermal joint 4 preferably contains at least one selected from the group consisting of nitrogen, neon, para-hydrogen, and water. More preferably, the substance mainly contains these components solely or in combination. The substance containing only one of these compounds in a high purity (for example, 99.99% or more) has an excellent thermal conductivity and thus is more suitable.

According to the embodiment of the present invention, the substance of the thermal joint 4 is nitrogen. In the operational status shown in FIG. 1, the thermal joint 4 is in a solid state, and nitrogen gas is present at a saturated vapor pressure within the sleeve 12.

In general, the thermal conductivity of solid nitrogen reaches its peak of about 20 W/m/K at 4.2 K, at which the superconducting magnet 7 is operated. This value is comparable to that of an alloy, such as solder. Thus, the temperature difference between the second cooling stage 6 and the recondenser 17 can be greatly reduced. For example, when the space between the second cooling stage 6 and the recondenser 17 is $1\times10^{-4}$ m, the cooling capacity of the second cooling stage 6 is 1 W, and the heat transfer area is 0.005 m$^2$, then the temperature difference will be only 0.001 K. Thus, thermal contact that is comparable to that in the case where the second cooling stage 6 is connected to the recondenser 17 via a metal can be obtained.

The cryocooler unit 1 is shut down when it is removed for maintenance or fixing. This increases the temperature of the thermal joint 4 and causes solid nitrogen to melt, thus separating the second cooling stage 6 and the recondenser 17.

To mount the cryocooler unit 1, liquid nitrogen is charged into the sleeve 12 to form a liquid layer having a predetermined thickness on the recondenser 17. Then, the cryocooler unit 1 is mounted inside the sleeve 12, and the lower end of the second cooling stage 6 is immersed in liquid nitrogen. After the cryocooler unit 1 is started, liquid nitrogen is cooled by the second cooling stage 6 into solid. Through the thermal joint 4 of this solid nitrogen, the second cooling stage 6 is thermally coupled to the recondenser 17.

Figure 2:
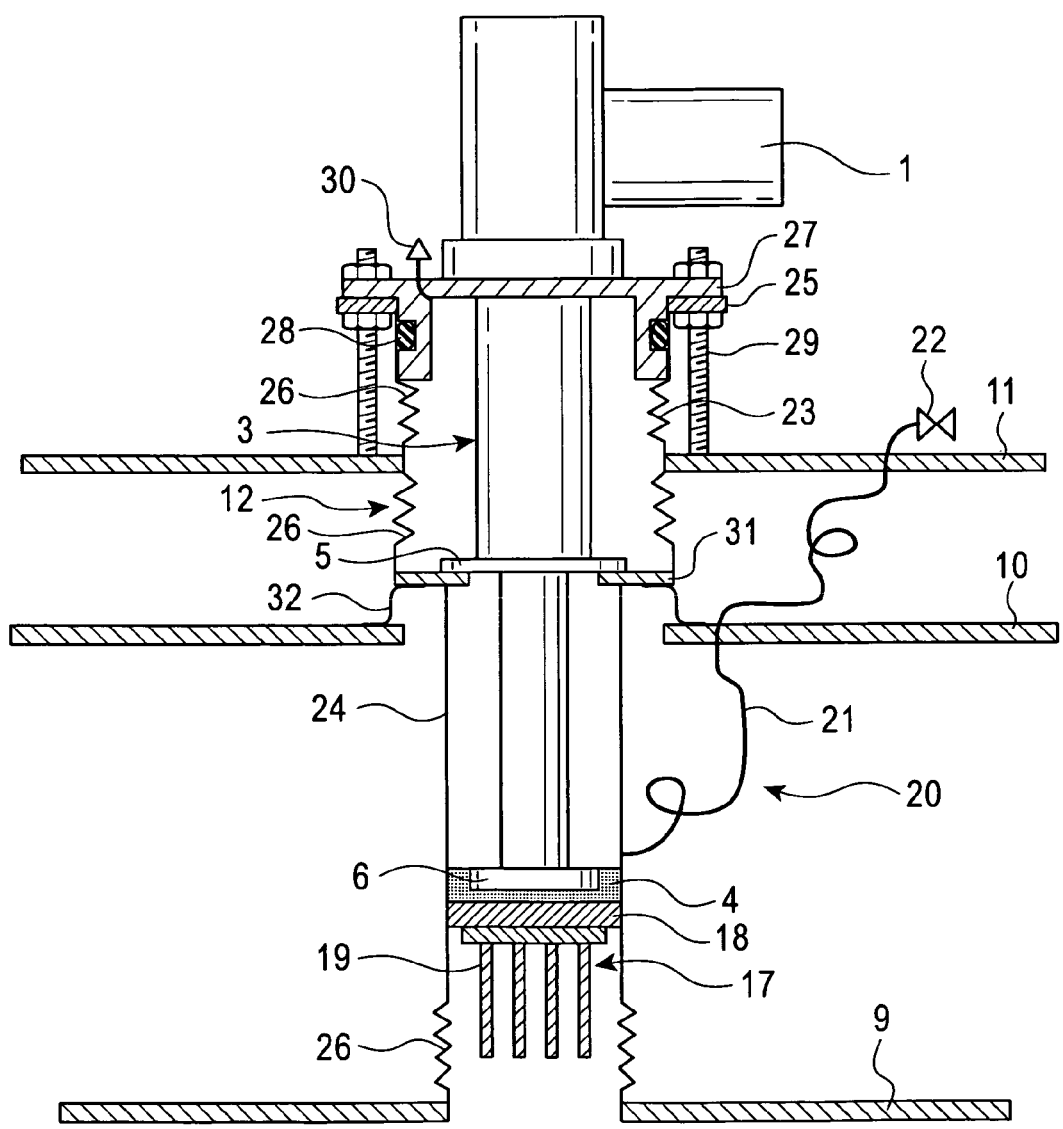
FIG. 2 is an enlarged view of a principal part according to another embodiment of the present invention.

FIG. 2 is another embodiment of the present invention. Like components are denoted by like numerals in FIG. 1. Unlike the embodiment in FIG. 1, heating means 20 for heating a substance of a thermal joint 4 in a sleeve 12 is provided.

The heating means 20 includes a gas feed pipe 21 connected to the sleeve 12. One end of the gas feed pipe 21 has an opening in the sleeve 12 in the vicinity of the thermal joint 4, and the other end is disposed outside a vacuum chamber 11 and is provided with a gas feed valve 22. The gas feed valve 22 is connected to a nitrogen gas feeder (not shown). Nitrogen gas supplied from the nitrogen gas feeder heats the thermal joint 4 and melts the solid nitrogen.

The structure of the sleeve 12 according to this embodiment is different from that shown in FIG. 1.

That is, the sleeve 12 consists of an upper sleeve 23 surrounding a first cooling stage 5 and a lower sleeve 24 surrounding a second cooling stage 6.

The upper sleeve 23 is composed of a circular poor thermal conductor. The upper sleeve 23 has at its upper end an upper flange 25 radially and outwardly protruding. Between the upper end and the lower end, the upper sleeve 23 is provided with a deformation absorber 26 for absorbing vertical deformation. This deformation absorber 26 has a pleated shape. The upper opening of the upper sleeve 23 is hermetically fitted to a top lid 27 with an O-ring 28 therebetween. The top lid 27 is fixed on the upper flange 25 in a manner such that it can be attached and removed as desired.

The cryocooler unit 1 is fixed on the top lid 27. Bolts 29 for adjusting the height of the top lid 27 relative to the vacuum chamber 11 are provided in the upper flange 25. The top lid 27 is provided with a check valve 30 for maintaining a constant pressure when the internal pressure of the sleeve 12 exceeds the atmospheric pressure by a predetermined value.

A lower flange 31 is connected to the lower end of upper sleeve 23. This lower flange 31 is composed of a good thermal conductor and is in contact with the first cooling stage 5. The lower flange 31 is thermally coupled to a radiation-shield 10 via a copper braid 32.

The lower sleeve 24 is composed of a poor thermal conductor and is connected at its upper end to the lower flange 31. A deformation absorber 26 in a pleated shape is disposed under the lower sleeve 24 and is connected at its lower end to a liquid helium container 9.

The lower sleeve 24 is internally sectioned into hermetic upper and lower halves by a shield plate 18 at the level higher than the deformation absorber 26. This shield plate 18 is composed of a good thermal conductor. A fin 19 is suspended from the undersurface of the shield plate 18. The shield plate 18 and the fin 19 constitute a recondenser 17.

A space is formed between the upper surface of the recondenser 17 and the lower surface of the second cooling stage 6, and is filled with the substance of the thermal joint 4. The gas feed pipe 21 is connected to the side of the sleeve 24 near the bottom of the thermal joint 4. The gas feed pipe 21 passes through the vacuum chamber 11 in a compartment being at room temperature and is connected to a gas feed valve 22 outside the cryogenic system. Thus, heating gas can be introduced into the vicinity of the sleeve 12 from the outside of the system.

Figure 3:
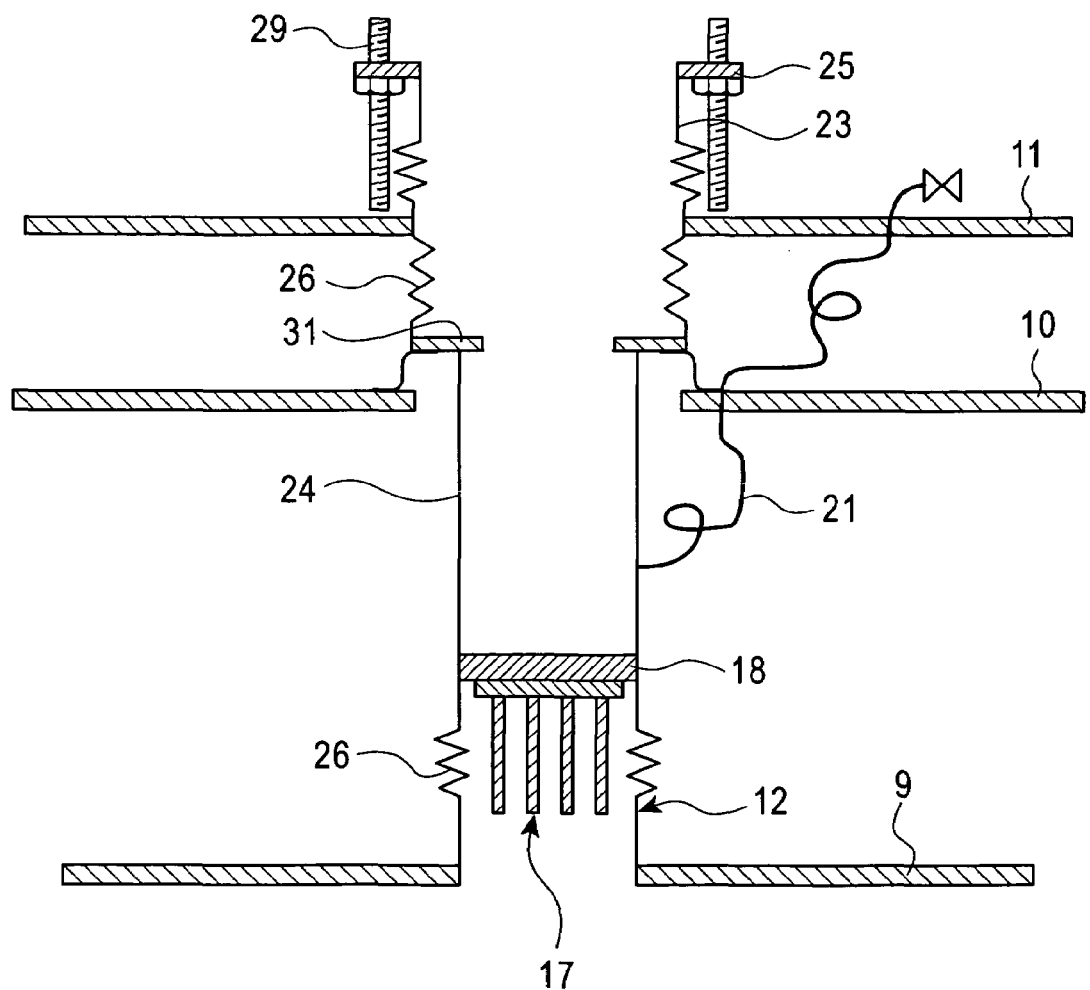
FIG. 3 is an explanatory view of the operation according to the embodiment of the present invention shown in FIG. 2.
Figure 4:
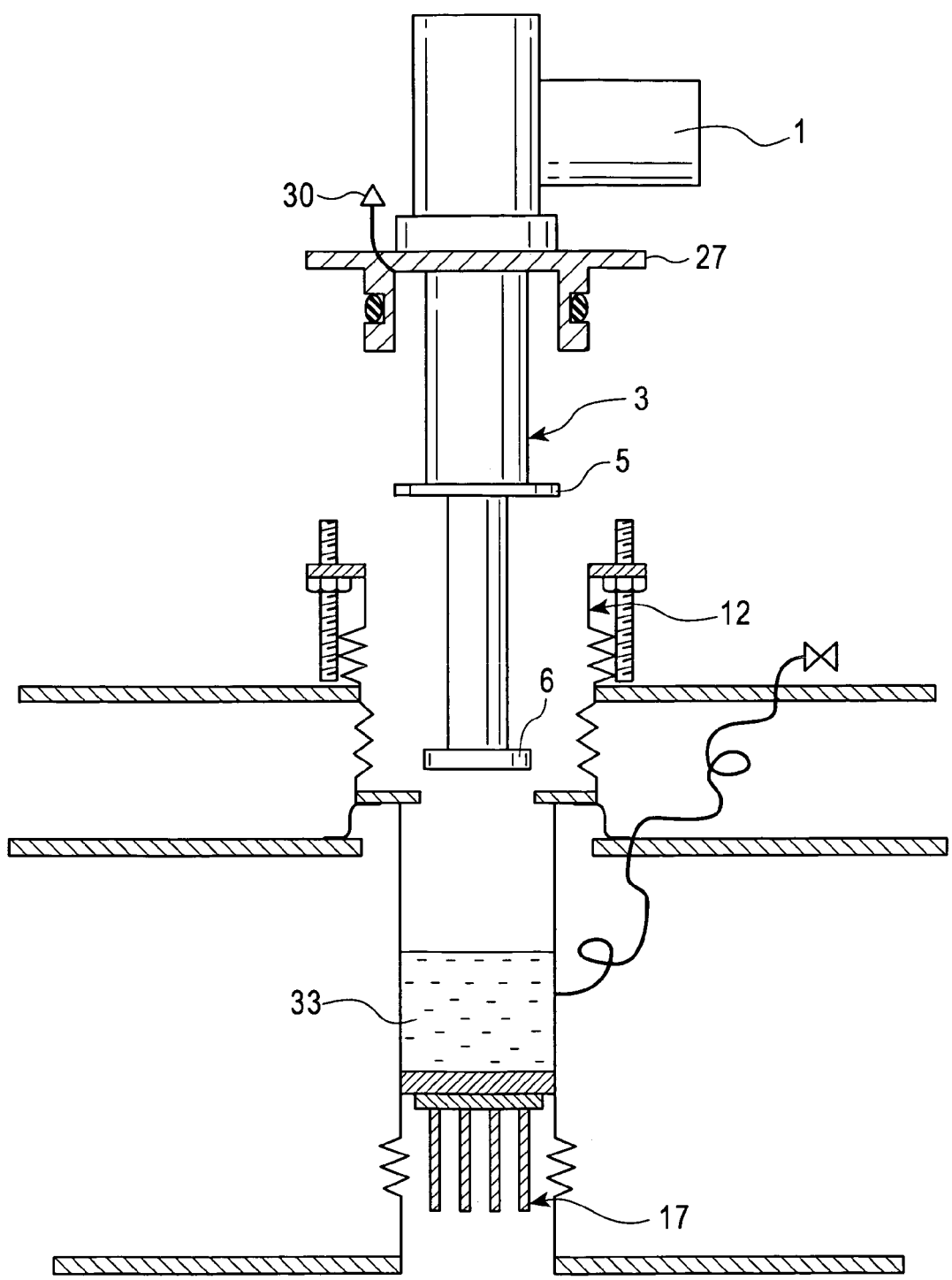
FIG. 4 is an explanatory view of the operation according to the embodiment of the present invention shown in FIG. 2.
Figure 5:
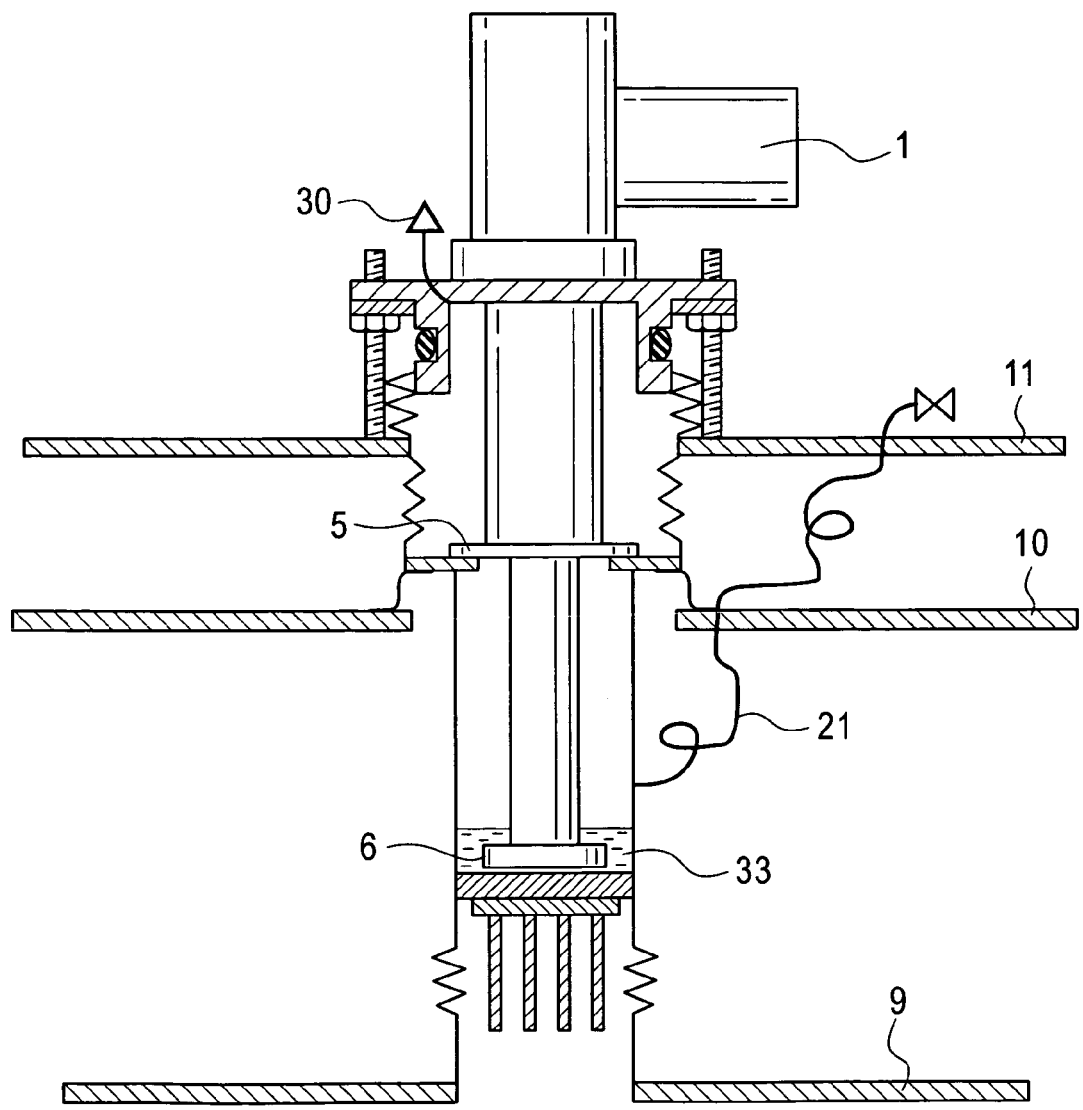
FIG. 5 is an explanatory view of the operation according to the embodiment of the present invention shown in FIG. 2.

FIGS. 3 to 5 are explanatory views of the operation of the system shown in FIG. 2.

When precooling starts, the sleeve 12 is in a state shown in FIG. 3. The sleeve 12 is opened at its upper end and communicates with the atmosphere. The element to be cooled is precooled with cryogen. According to the present invention, evaporated gas of cryogen generated by the precooling of the element to be cooled is not discharged from the sleeve 12 into the atmosphere. Thus, even when the liquid helium container 9 is filled with liquid helium 8, the recondenser 17 in the sleeve 12 has a considerably high temperature (for example, the temperature of liquid nitrogen or higher).

Then, as shown in FIG. 4, liquid nitrogen 33 is charged into the sleeve 12.

Then, the cryocooler unit 1 is mounted inside the sleeve 12. The second cooling stage 6 of the cryocooler unit 1 is immersed in liquid nitrogen 33 and is precooled. Liquid nitrogen 33 absorbs heat from the second cooling stage 6 to evaporate. The evaporated nitrogen is discharged from the opening at the upper end of the sleeve 12 into the atmosphere. While liquid nitrogen 33 evaporates rapidly, the top lid 27 of the sleeve should not completely be attached to the upper flange 25 so that the interior of the sleeve can communicate with the atmosphere to a certain extent.

When the second cooling stage 6 is completely precooled and the evaporation rate of the liquid nitrogen 33 almost reaches a constant value, nitrogen gas is fed from the gas feed valve 22 via the gas feed pipe 21 to the bottom of the sleeve 12 to evaporate liquid nitrogen 33 so that liquid nitrogen 33 remains only between the second cooling stage 6 and the recondenser 17, as shown in FIG. 5.

Then, the top lid 27 is completely attached to the upper flange 25 to seal the sleeve 12. Then, the cryocooler unit 1 is started. Once the second cooling stage 6 of the cryocooler unit 1 has already been sufficiently precooled, the cooling stage 3 can immediately reach a steady-state operating temperature.

When the second cooling stage 6 decreases in temperature, liquid nitrogen is cooled and solidifies in a short time. Most parts within the sleeve 12 contain only a small amount of gas at a saturated vapor pressure.

In this way, the second cooling stage 6 cools the recondenser 17 via the thermal joint 4.

The following is a procedure for replacing the cryocooler unit 1.

First, the cryocooler unit 1 is brought to a halt. Nitrogen gas is then fed from the gas feed valve 22 via the gas feed pipe 21 to increase the temperature of the lower sleeve 24. Nitrogen gas introduced into the sleeve 12 melts and evaporates solid nitrogen in the thermal joint 4, thereby separating the second cooling stage 6 from the shield plate 18, and finally escapes from the check valve 30 of the top lid 27 into the atmosphere. Since the recondenser 17 and the liquid helium container 9 are separated by the lower sleeve 24 being a poor thermal conductor, heat flowing into the liquid helium container 9 is reduced, so that the entire liquid helium does not reach 4.2 K during maintenance.

When solid nitrogen around the second cooling stage 6 evaporates and is completely removed, the cryocooler unit 1 and the top lid 27 are lifted up to remove the cryocooler unit 1. During this removal, nitrogen gas is continuously supplied from the gas feed pipe 21 to reduce the air contamination in the sleeve 12 to a minimum. When cryocooler unit 1 is completely removed, the temperature of the lower sleeve 24 at levels higher than the shield plate 18 has already reached about 80 K, for example.

Then, in a similar way to the precooling, liquid nitrogen is fed into the sleeve 12. In this case, since the internal temperature of the sleeve 12 is sufficiently low, liquid nitrogen does not evaporate in large quantity.

Then, a new cryocooler unit 1 is placed in the sleeve. From then on, procedures similar to those of precooling the cryostat is followed, and finally the cryocooler unit 1 is started. As is the case with the precooling, the interior of the sleeve 12 is already precooled sufficiently and therefore the cryocooler unit 1 can immediately reach a steady-state operating temperature.

According to the embodiment described above, the gas feed pipe 21 avoids possible air contamination in the sleeve 12 during the replacement of the cryogenic system and thus prevents the degradation of the thermal contact, which should be kept clean.

Furthermore, since solid nitrogen used as the substance of the thermal joint 4 has a heat transfer coefficient similar to that of phosphorous-deoxidized copper at temperatures around 4.2 K, the thermal joint 4 can be smaller than a copper brade, and thus the temperature difference in the thermal joint 4 can be reduced. In addition, the system according to the embodiment of the present invention can increase the temperature locally, and evaporate only solid nitrogen to make the second cooling stage 6 detachable, allowing for immediate replacement of the cryocooler unit 1.

Figure 6:
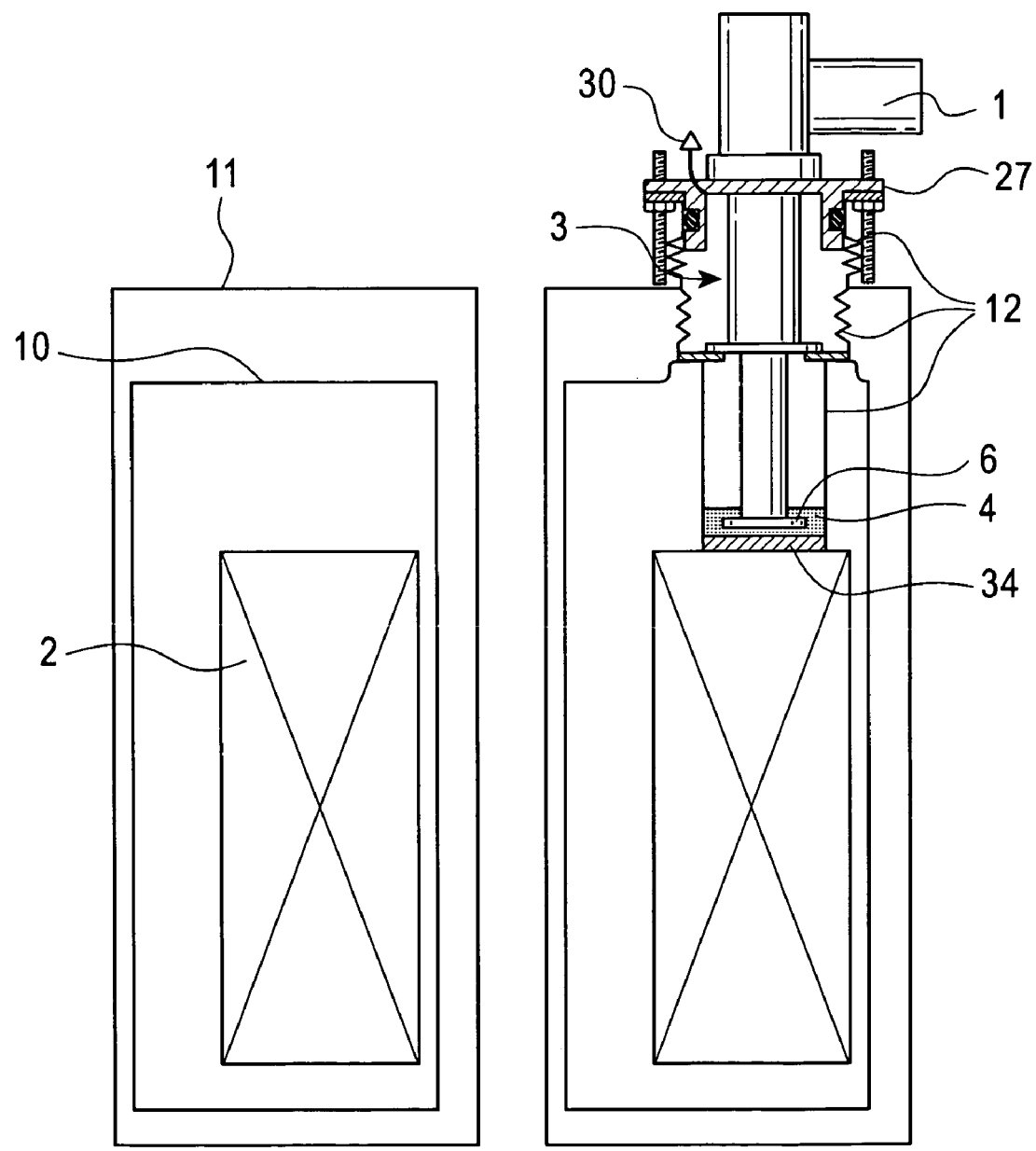
FIG. 6 is a schematic sectional view of a cryogenic system according to another embodiment of the present invention.

FIG. 6 shows another embodiment of the present invention, in which a cryogenic system is directly cooled with a cryocooler unit and an element to be cooled 2 is not immersed in cryogen.

The element to be cooled 2, such as a superconductive magnet, is housed in a vacuum chamber 11 and is cooled with a second cooling stage 6 of the cryocooler unit 1. Furthermore, to reduce the thermal radiation from the vacuum chamber 11 to the element to be cooled 2, a radiation-shield 10 is provided between the vacuum chamber 11 and the element to be cooled 2, and is cooled with a first cooling stage 5. The cryocooler unit 1 is housed in the sleeve 12, which is provided at the lower end with a bottom lid 34. The bottom lid 34 is thermally coupled to the second cooling stage 6 of the cryocooler unit 1 via a thermal joint 4.

This embodiment has the same structure with that in FIG. 2, except that the element to be cooled 2 is not indirectly cooled by the action of a recondenser. Thus, the same procedures described for FIG. 2 can be applied to the replacement of the cryogenic system.

Thus, according to the present embodiment, in the replacing procedure of the cryogenic system, the element to be cooled is only heated to about 80 K. This does not require a large amount of heat, unlike the conventional method in which the temperature is increased to room temperature. Thus, economical and rapid maintenance can be performed.

Figure 7:
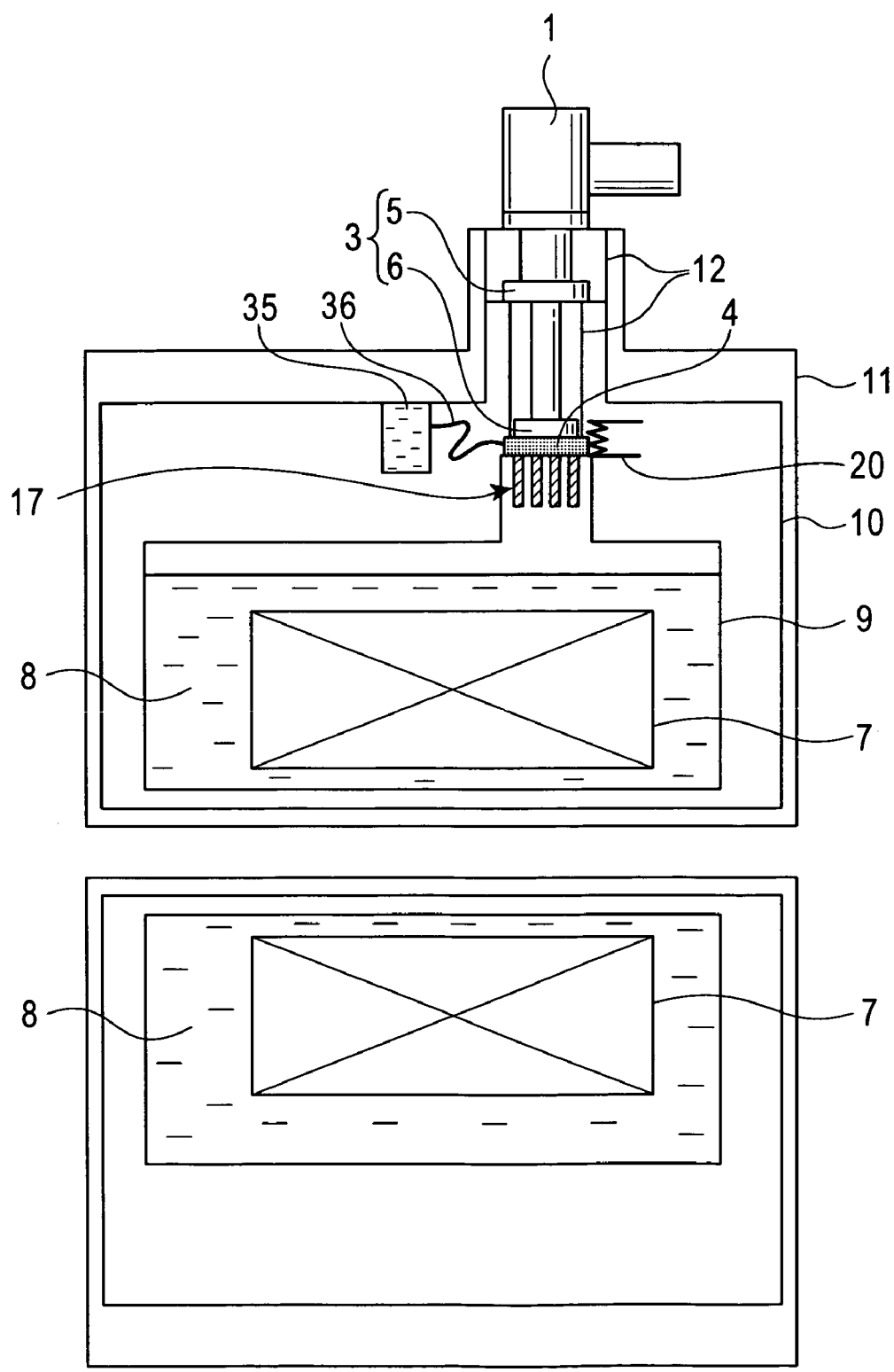
FIG. 7 is a schematic sectional view of a cryogenic system according to another embodiment of the present invention.

FIG. 7 shows another embodiment of the present invention.

This embodiment differs from the other embodiments described above in that a sleeve 12 is connected to a buffer tank 35, which contains a substance of a thermal joint 4, and that heating means 20 is a heater provided in the vicinity of a thermal joint 4.

The buffer tank 35 is fixed on the inner surface of a radiation-shield 10 and communicates with the interior of a sleeve 12 via a connecting pipe 36, so that the substance can flow between the sleeve 12 and the buffer tank 35.

The amount of the substance of the thermal joint 4 is adjusted so that when it is solidified a solid phase is formed only in the thermal joint 4 and the buffer tank 35 is filled with gas.

The heating means 20 can heat the thermal joint 4 to a desired temperature.

According to this embodiment, when the cryocooler unit 1 is removed, the heating means 20 is operated to maintain the substance of the thermal joint 4 at a temperature such that the substance is converted into gas. The substance expands through this operation and the excess substance flows into the buffer tank 35. When the internal volume of the buffer tank 35 is about 100 times as large as that of the thermal joint 4, this does not increase the internal pressure significantly. Deductively, the internal pressure after the gasification may be determined based on withstanding pressures of the buffer tank 35 and the sleeve 12.

After the new cryocooler unit 1 is mounted and started, it takes additional time for the first cooling stage 5 and the second cooling stage 6 of the cryocooler unit 1 to reach each steady-state operating temperature. However, in the second cooling stage 6, since the thermal switch of the thermal joint 4 is off until the steady-state operating temperature is reached, heat transfer to a recondenser 17 and a liquid helium container 9 can be reduced to minimum.

When the temperature of the second cooling stage of the cryocooler unit 1 reaches a temperature between the melting point and the boiling point of the substance of the thermal joint 4, a preset temperature of the heating means 20 is changed to this temperature. When the cryocooler unit 1 is in operation, the temperature of the thermal joint 4 immediately decreases, and the substance stored mainly in the buffer tank 35 is liquefied at the thermal joint 4. During the liquefaction, generated heat of condensation is absorbed by the cryocooler unit 1. After the thermal joint 4 is filled with the substance, the heating means 20 is brought to a halt. Then, the substance of the thermal joint 4 immediately solidifies and returns to the state before the maintenance.

Figure 8:
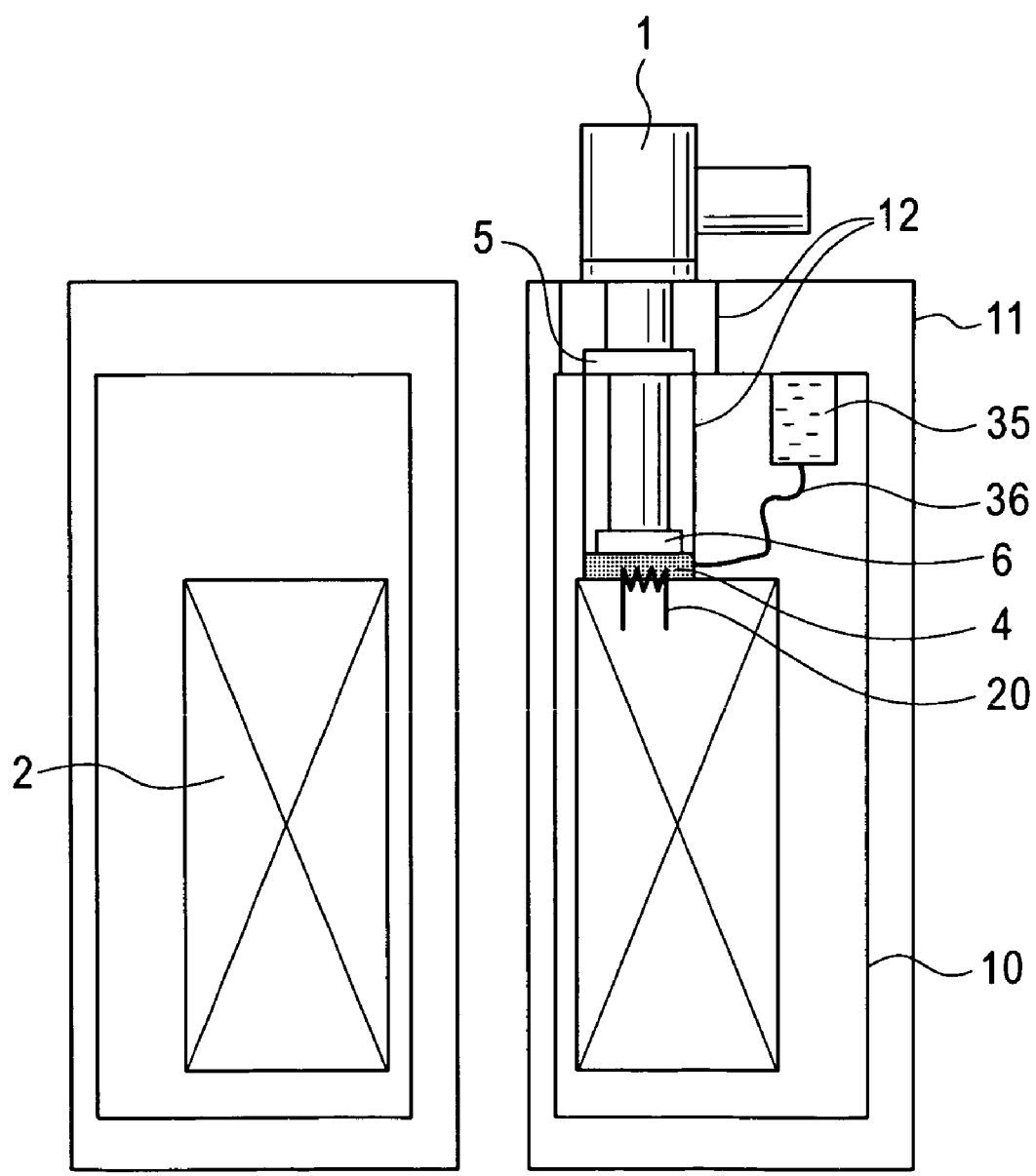
FIG. 8 is a schematic sectional view of a cryogenic system according to another embodiment of the present invention.

FIG. 8 shows another embodiment of the present invention, in which a cryogenic system is directly cooled with a cryocooler unit and has the structure shown in FIG. 7. An element to be cooled 2 is not immersed in cryogen.

Figure 9:
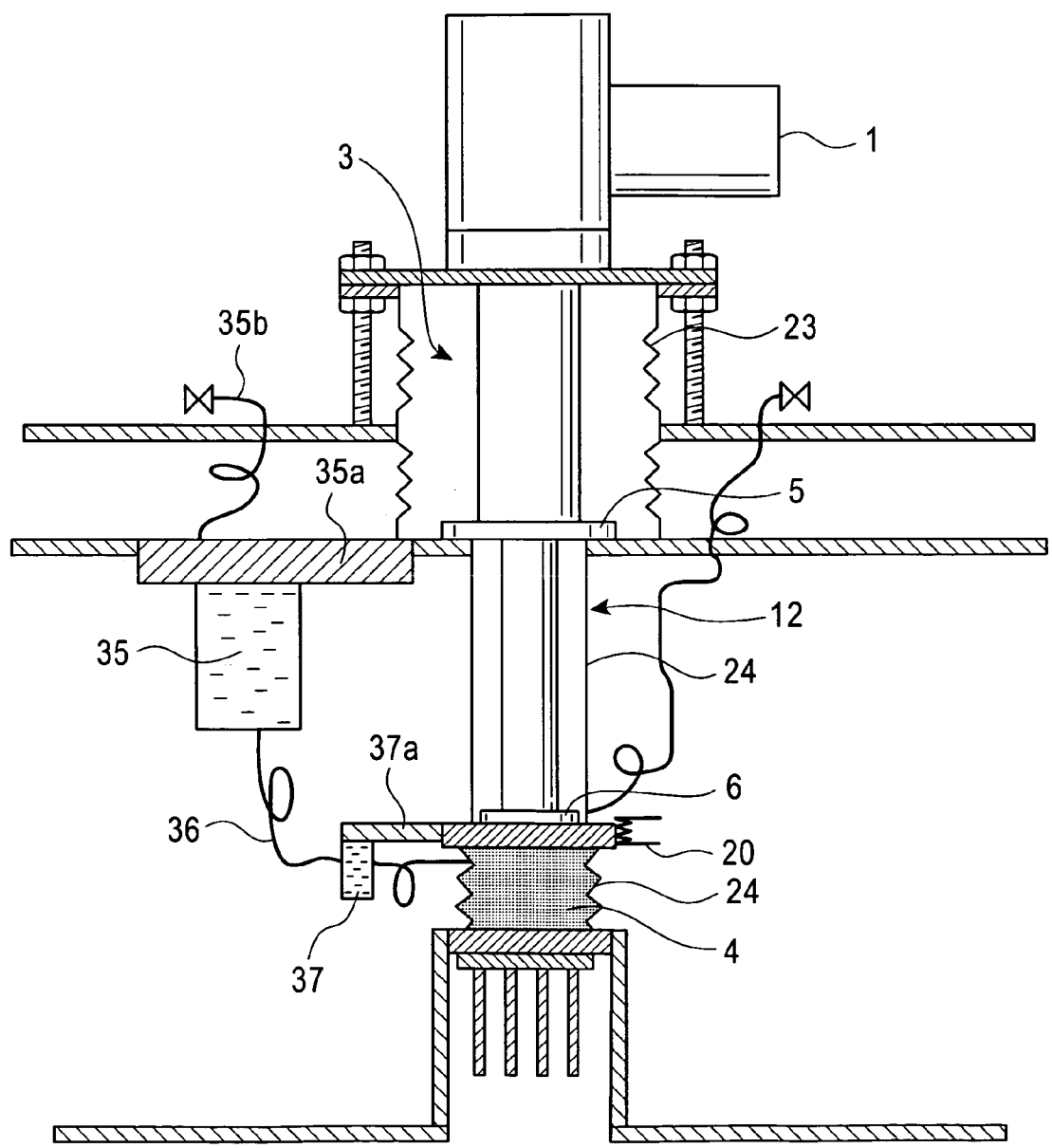
FIG. 9 is an enlarged view of a principal part according to another embodiment of the present invention.

FIG. 9 shows a cryogenic system according to another embodiment of the present invention. A substance stored in the buffer tank 35 is hydrogen. A catalyst vessel 37 containing a catalyst for ortho-para hydrogen conversion is connected to the buffer tank 35 via the connecting pipe 36. The catalyst vessel 37 is thermally coupled to a second cooling stage via a thermal conductor 37a. The buffer tank 35 is thermally coupled to a first cooling stage 5 via a thermal conductor 35a. The buffer tank 35 is connected to a supply pipe 35b, which extends across the vacuum chamber 11. Because of the catalyst in the catalyst vessel 37, para-hydrogen is converted into ortho-para hydrogen which is used as a substance of a thermal joint.

The thermal conductivity of para-hydrogen is more than 1 W/cm/K at about 4 K, about 0.008 W/cm/K at about 20 K near the boiling point, and 0.0004 W/cm/K at about 40 K, over the boiling point. The conductivity ratio reaches 2500:1. Thus, heat flow vertically passing through the thermal joint 4 decreases to 1/2500 when the temperatures at upper and lower ends are identical, and thereby thermal switch of off state can be achieved.

Figure 10:
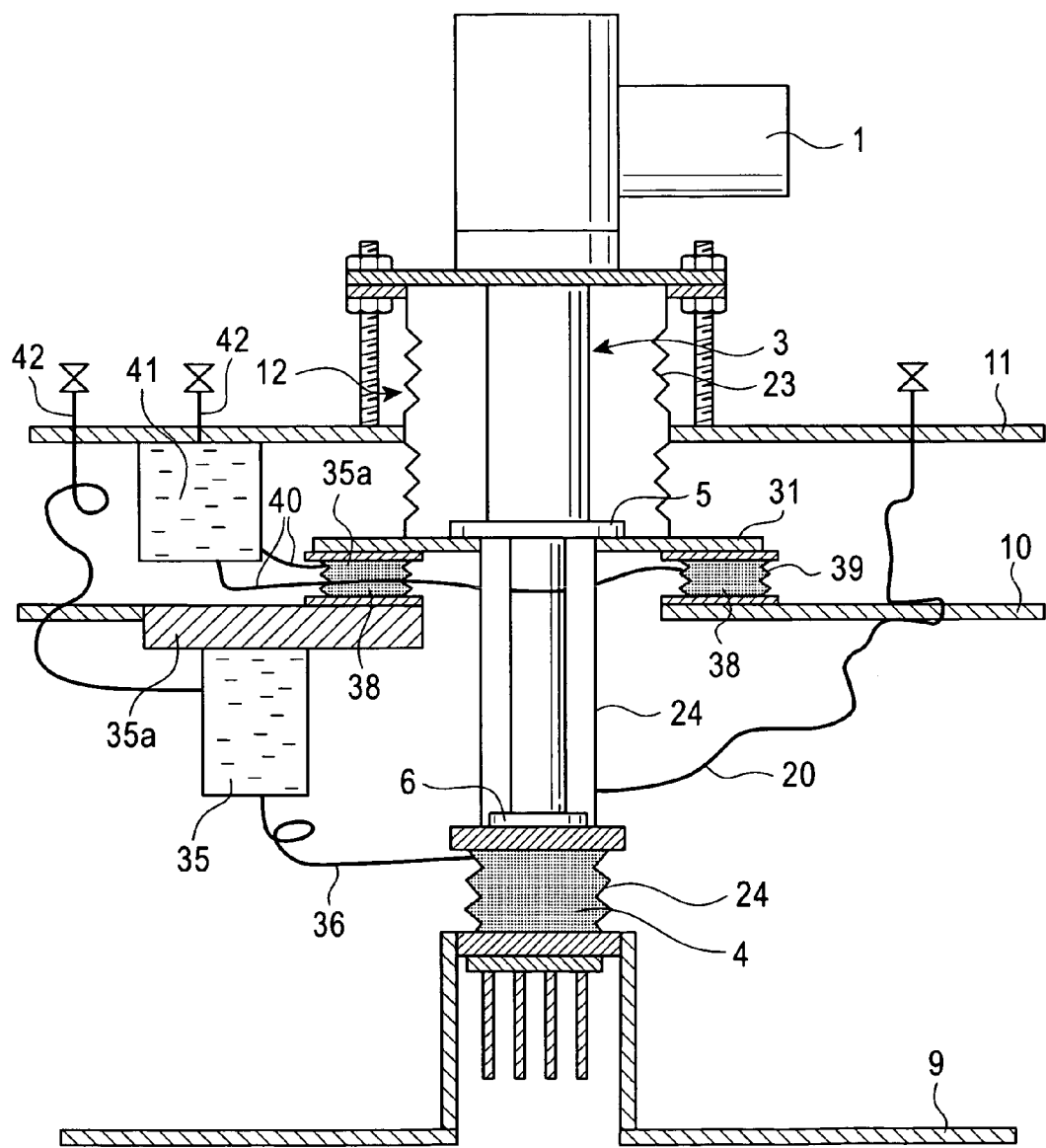
FIG. 10 is an enlarged view of a principal part according to another embodiment of the present invention.

FIG. 10 shows another embodiment of the present invention, in which a first cooling stage 5 is also provided with a thermal joint 38. That is, the thermal joint 38 is formed so as to fill a space provided between the first cooling stage 5 and a radiation-shield 10.

More specifically, a toroidal sleeve 39 is provided between the first cooling stage 5 and the radiation-shield 10, and is filled with a substance of the thermal joint 38. The sleeve 39 is connected to a buffer tank 41 via connecting pipes 40. This buffer tank 41 is mounted on the inner surface of a vacuum chamber 11.

The substance of the thermal joint 38 at the first cooling stage 5 is different from a substance of a thermal joint 4 at a second cooling stage 6, and has a higher melting point than the substance of the thermal joint 4. For example, when a steady-state operating temperature of the radiation-shield 10 is 60 K, the substance of the thermal joint 4 at the second cooling stage 6 is para-hydrogen, and the substance of the thermal joint 38 at the first cooling stage 5 is water.

The buffer tanks 35 and 41 is connected to supply pipes 42 extending across the vacuum chamber 11.

Figure 11:
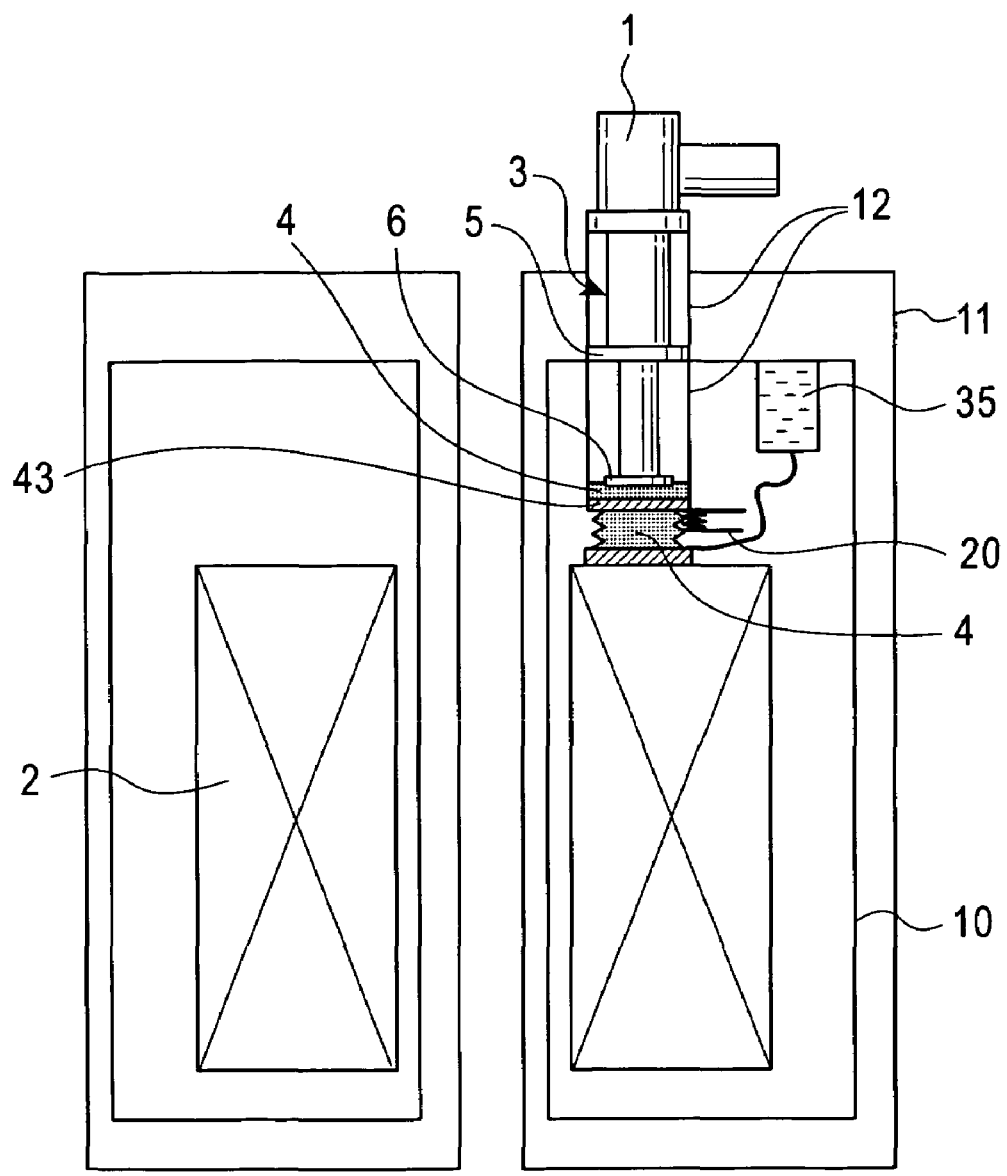
FIG. 11 is a schematic sectional view of a cryogenic system according to another embodiment of the present invention.

FIG. 11 shows another embodiment of the present invention, in which a cryogenic system is directly cooled with a cryocooler unit and an element to be cooled 2 is not immersed in cryogen. The cryogenic system has two thermal joints 4; that is, each thermal joint 4 is provided on each side of a bottom lid 43 of a sleeve 12.

Figure 12:
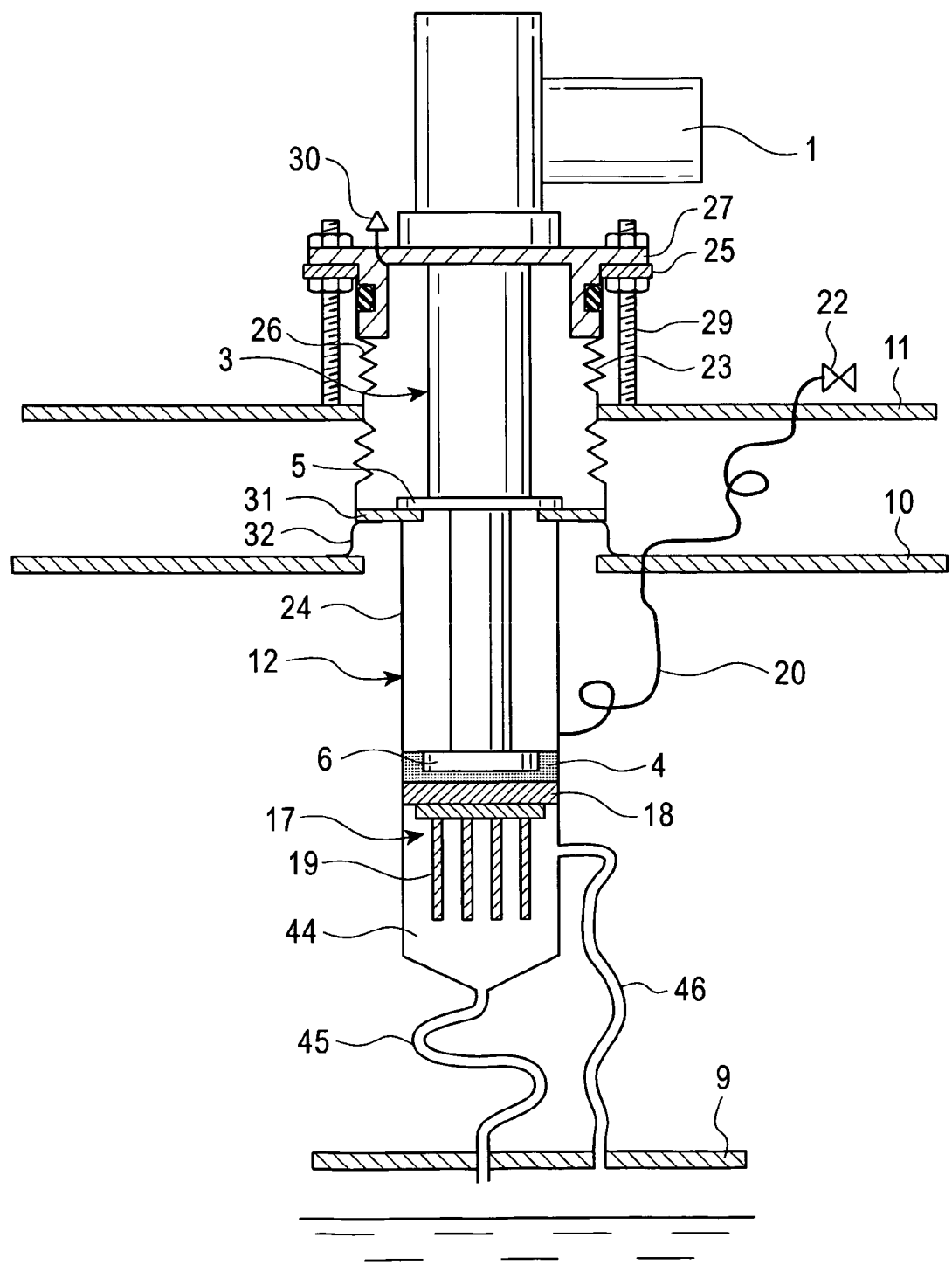
FIG. 12 is an enlarged view of a principal part according to another embodiment of the present invention.
Figure 13:
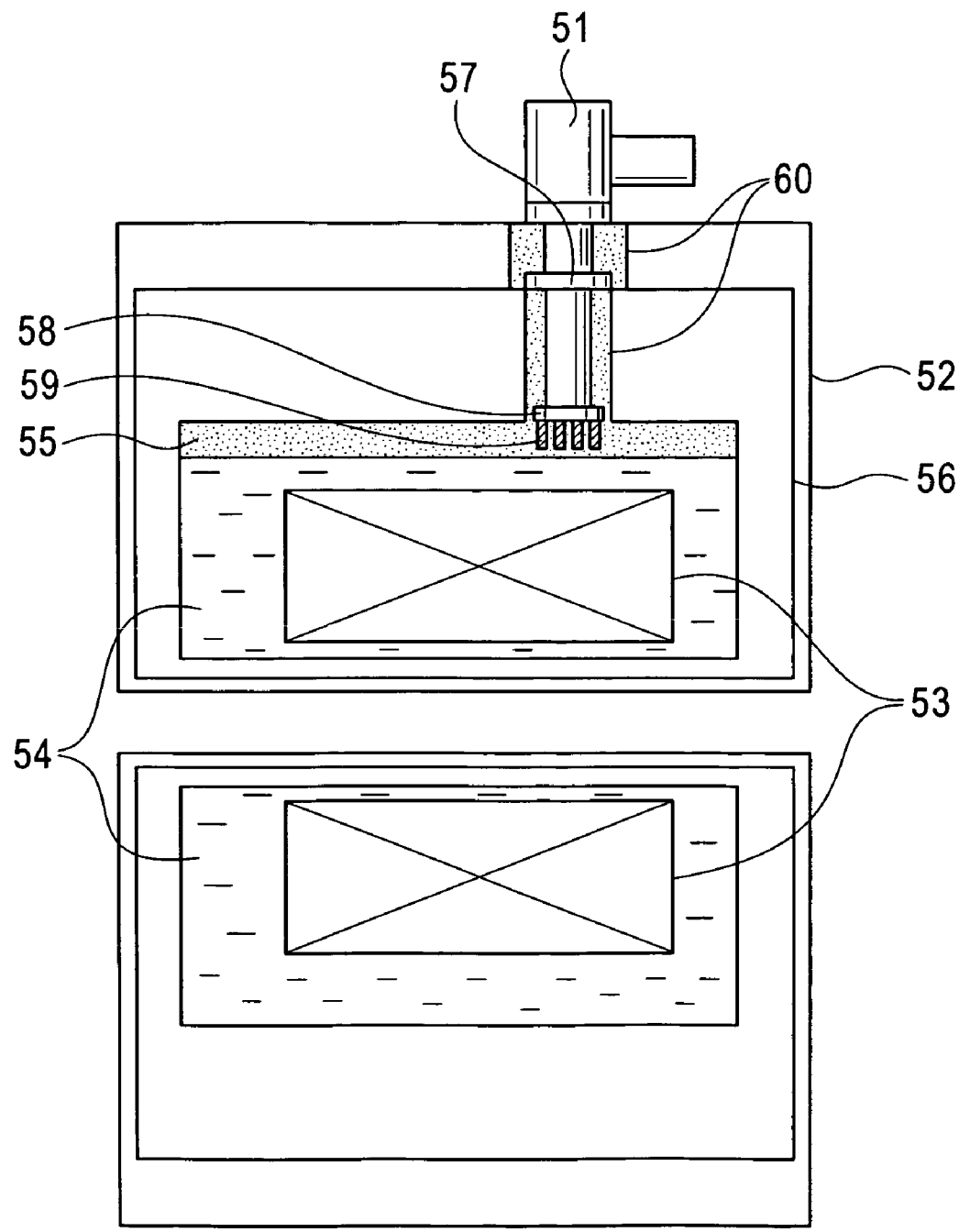
FIG. 13 is a schematic sectional view of a conventional cryogenic system.

FIG. 12 shows a cryogenic system using liquid helium, according to another embodiment of the present invention.

In this embodiment, the bottom of a sleeve 12 has a funnel shape. The sleeve 12 is internally sectioned into an upper half and a lower condensing chamber 44 by a recondenser 17. The lower end of the condensing chamber 44 and the top of a liquid helium container 9 are connected through a condensate-supply pipe 45. The upper part of the condensing chamber 44 and the top of the liquid helium container 9 are connected through an evaporated gas-supply pipe 46.

A thermal joint 4 is formed between the top of the recondenser 17 and the bottom of a second cooling stage 6.

When the temperature of the recondenser 17 is lower than the temperature of gas in the condensing chamber 44, helium liquefies on the surface of a fin 19 of the recondenser 17, is collected to the bottom, and returns to the liquid helium container 9 through the condensate-supply pipe 45. Concurrently, gas in the liquid helium container 9 is automatically fed to the condensing chamber 44 through the evaporated gas-supply pipe 46.

In the system shown in FIG. 12, since the condensing chamber 44 is connected to the liquid helium container 9 via the condensate-supply pipe 45 and the evaporated gas-supply pipe 46 each having a small cross-section, heat transfer from the condensing chamber 44 to the liquid helium container 9 is reduced to a minimum.

The present invention is not limited to each embodiment described above. In addition, it is needless to say that various modifications may be made without departing from the gist of the present invention. For example, the present invention may be applied to NMR.

The present invention can be utilized in medical apparatus industries, such as MRI, and precision analysis instrument industries, such as NMR.

What is claimed is:

1. A cryogenic system comprising:
   a cryocooler unit;
   an element to be cooled;
   a cooling stage of said cryocooler unit, said cooling stage being provided so that a space formed between said cooling stage of said cryocooler unit and said element to be cooled; and
   a thermal joint placed in said space,
   wherein said thermal joint is composed of a substance that has a melting point higher than the cooling temperature of said element to be cooled and that is in a liquid or gaseous state at room temperature and atmospheric pressure, and wherein said thermal joint functions as a thermal switch which is on when the substance is in a solid state,
   the substance of the thermal joint is in a solid state when the cryocooler unit is in operation, and in a liquid or gaseous state when the cryocooler unit is at rest, and
   the substance contains at least one selected from the group consisting of nitrogen, neon, para-hydrogen, and water.

2. The cryogenic system according to claim 1, further comprising a sleeve housing said thermal joint.

3. The cryogenic system according to claim 1, further comprising means for heating said thermal joint.

4. The cryogenic system according to claim 1, further comprising a buffer tank for storing the substance, and a connecting pipe, wherein said buffer tank is connected to said thermal joint via said connecting pipe.

5. A cryogenic system comprising
   a cryocooler unit;
   an element to be cooled;
   a cooling stage of said cryocooler unit, said cooling stage being provided so that a space formed between said cooling stage of said cryocooler unit and said element to be cooled;
   a thermal joint placed in said space;
   a buffer tank for storing the substance;
   a connecting pipe; and
   a catalyst vessel containing a catalyst,
   wherein said thermal joint is composed of a substance that has a melting point higher than the cooling temperature of said element to be cooled and that is in a liquid or gaseous state at room temperature and atmospheric pressure, and wherein said thermal joint functions as a thermal switch which is on when the substance is in a solid state,
   wherein said buffer tank is connected to said thermal joint via said connecting pipe, and
   wherein the substance stored in said buffer tank is hydrogen, the catalyst is for ortho-para hydrogen conversion and said catalyst vessel is intervened by said connecting pipe.

6. The cryogenic system according to claim 2, wherein said element to be cooled includes a liquid helium container including a superconducting magnet and liquid helium, said sleeve is provided on said helium container, an enclosed recondenser is vertically provided in said sleeve, and said thermal joint is formed on said recondenser.

7. The cryogenic system according to claim 2, further comprising a radiation-shield covering said element to be cooled and a vacuum chamber covering the circumference of said radiation-shield, wherein said sleeve is provided between said vacuum chamber and said element to be cooled, and said cooling stage is provided in said sleeve in a manner such that said cooling stage can be inserted and removed as desired.

8. The cryogenic system according to claim 1, wherein said cooling stage includes a first cooling stage on the side of higher temperatures and a second cooling stage on the side of lower temperatures, said first cooling stage cooling said radiation-shield and said second cooling stage cooling said element to be cooled, wherein at least one of said first cooling stage and said second cooling stage is provided with said thermal joint.

9. A cryogenic system, comprising:
   a cryocooler unit;
   an element to be cooled;
   a cooling stage of said cryocooler unit, said cooling stage being provided so that a space formed between said cooling stage of said cryocooler unit and said element to be cooled;
   a thermal joint placed in said space; and
   a sleeve housing said thermal joint,
   wherein said thermal joint is composed of a substance that has a melting point higher than the cooling temperature of said element to be cooled and that is in a liquid or gaseous state at room temperature and atmospheric pressure, and wherein said thermal joint functions as a thermal switch which is on when the substance is in a solid state, and
   wherein a surface of said element to be cooled, in contact with said thermal joint, is made of a first material, and said sleeve is made of a second material having a lower thermal conductivity than the first material, and said sleeve is provided with a deformation absorber for absorbing vertical deformation.

10. The cryogenic system according to claim 4, further comprising a catalyst vessel containing a catalyst, wherein the substance stored in said buffer tank is hydrogen, the catalyst is for ortho-para hydrogen conversion and said catalyst vessel is intervened by said connecting pipe.

11. The cryogenic system according to claim 2, wherein a surface of said element to be cooled, in contact with said thermal joint, is made of a first material, and said sleeve is made of a second material having a lower thermal conductivity than the first material, and said sleeve is provided with a deformation absorber for absorbing vertical deformation.

* * * * *